United States Patent
McDonald et al.

(10) Patent No.: US 6,963,828 B1
(45) Date of Patent: Nov. 8, 2005

(54) METAFARM SIZER CONFIGURATION OPTIMIZATION METHOD FOR THIN CLIENT SIZING TOOL

(75) Inventors: Kathryn Ann McDonald, Yorba Linda, CA (US); Leonard Eugene Eismann, Rancho Santa Margarita, CA (US); Sharon Marie Lee, Mission Viejo, CA (US)

(73) Assignee: Unisys Corporation, Blue Bell, PA (US)

( * ) Notice: Subject to any disclaimer, the term of this patent is extended or adjusted under 35 U.S.C. 154(b) by 866 days.

(21) Appl. No.: 09/813,672

(22) Filed: Mar. 21, 2001

(51) Int. Cl.[7] ............................. G06F 9/45; G06F 9/44; G06F 9/50
(52) U.S. Cl. ........................ 703/22; 703/21; 703/1
(58) Field of Search ............................. 709/220–222, 709/237, 227–228, 238–242, 26, 226, 21, 709/22

(56) References Cited

U.S. PATENT DOCUMENTS

| | | | | |
|---|---|---|---|---|
| 5,500,934 A | * | 3/1996 | Austin et al. | 345/853 |
| 5,668,995 A | * | 9/1997 | Bhat | 718/104 |
| 6,212,559 B1 | * | 4/2001 | Bixler et al. | 709/221 |
| 6,665,714 B1 | * | 12/2003 | Blumenau et al. | 709/222 |
| 6,754,702 B1 | * | 6/2004 | Kennelly et al. | 709/223 |
| 6,779,082 B2 | * | 8/2004 | Burger et al. | 711/114 |
| 6,834,326 B1 | * | 12/2004 | Wang et al. | 711/114 |
| 6,847,984 B1 | * | 1/2005 | Midgley et al. | 707/204 |

* cited by examiner

Primary Examiner—Jean R. Homere
Assistant Examiner—Mussa Shaawat
(74) Attorney, Agent, or Firm—Alfred W. Kozak; Mark T. Starr; Lise A. Rode

(57) ABSTRACT

A method for sizing Server Farms and developing an Metafarm which allocates the optimum number of Users to each Server Farm in the complex while also providing an optimized configuration of Server Farms having a desired Availability Level and suitable redundancy to fulfill the requirements and needs in a customer's enterprise.

4 Claims, 5 Drawing Sheets

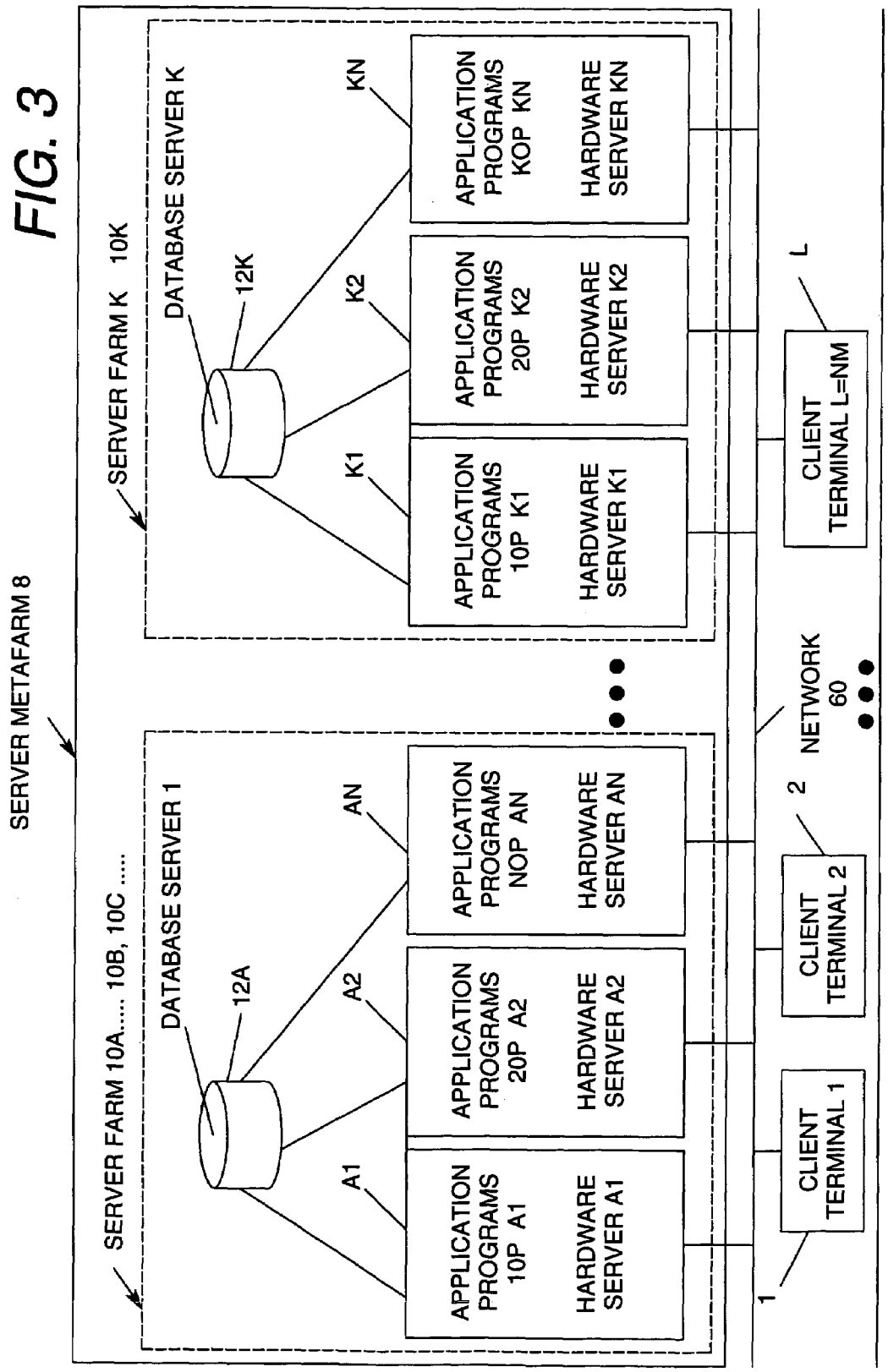

METAFARM SIZER CONFIGURATION OPTIMIZATION METHOD FOR THIN CLIENT SIZING TOOL

CROSS-REFERENCES TO RELATED APPLICATIONS

This application is related to co-pending applications designated hereinbelow and which are all included herein by reference.

U.S. Ser. No. 09/813,667, entitled "THIN CLIENT SIZING TOOL FOR ENTERPRISE SERVER FARM SOLUTION CONFIGURATOR";

U.S. Ser. No. 09/813,671, entitled "CONFIGURATION INTERVIEW SESSION METHOD FOR THIN CLIENT SIZING TOOL";

U.S. Ser. No. 09/813,670, entitled "SOLUTION GENERATION METHOD FOR THIN CLIENT SIZING TOOL";

U.S. Ser. No. 09/813,668, entitled "METHOD FOR CALCULATING USER WEIGHTS FOR THIN CLIENT SIZING TOOL";

U.S. Ser. No. 09/813,669, "METHOD FOR CALCULATING MEMORY REQUIREMENTS FOR THIN CLIENT SIZING TOOL";

U.S. Pat. No. 6,496,948 entitled "METHOD FOR ESTIMATING THE AVAILABILITY OF AN OPERATING SERVER FARMS";

U.S. Pat. No. 6,571,283 entitled "METHOD FOR SERVER FARM CONFIGURATION OPTIMIZATION";

U.S. Ser. No. 09/705,441, entitled "METHOD FOR SERVER METAFARM CONFIGURATION OPTIMIZATION".

FIELD OF THE INVENTION

This disclosure involves a sizing tool which will enable recommendations to be made for subdividing extremely large groups of users into numbers of Farms which constitute a Metafarm in order to provide configuration optimization in a Thin Client Sizing Tool.

BACKGROUND OF THE INVENTION

In the prior art, many attempts at configuring and optimizing Enterprise Server systems for different types of customers involved considerable guesswork and trial-by-error methods in trying to determine the best configuration of Servers and Server Farms which would be most suitable for the customer.

As was previously discussed in the co-pending applications, many times a particular customer is not exactly sure what his present and what his future requirements are or will be, and he must be led through a series of interviews and communication processes to establish parameters for his intended network operations. From this, there is developed what is called a "Customer Profile".

It is most desirable to develop some orderly arrangement to collect and manage the information from the customer's profile in order to configure a particular type of Server Farm system which will be useful to provide the optimum delivery of services to the customer and with a minimum amount of cost, price and downtime.

When there are many large groups of users involved, then there is often used what are called "Metafarms", that is to say, groups of servers which form a Farm and then are connected in clusters to form a series of Server Farms. The present method involves an algorithm which will take a rather precise estimate of a customer's profile and then provide a set of configuration recommendations for Server Farms which will subdivide the customer's users into manageable-size Server Farms. Later, this information can be applied to the Thin Client Sizing Tool general algorithm in order to further enhance the solutions to be presented to a potential customer. The present method provides solutions generated which are based on benchmark numbers and certain formulae determined by design engineers to be the most efficient.

Thus, the presently-disclosed method takes into account server preferences and the server's subsequent benchmark testing information in order to design an optimum configuration which will be most suitable to the customer or user. Recommendations are made to subdivide and allocate large groups of Users into Server Farms which are clustered into a Metafarm having an optimized configuration for the particular enterprise.

SUMMARY OF THE INVENTION

The presently-described method involves a method for sizing Metafarms in order to provide a configuration which will optimize the services provided to a specific customer's enterprise.

At first, a series of inputs is developed which indicates the number of users the customer will require, his goals for the availability, the User-weight utilization and the Server preference, which input data is then combined with a selected redundancy factor (Rf).

The next step is to initialize a starting point of one Server Farm by getting information from a Server database to get the Benchmark number of Users suitable for a Server to handle. This is followed by calculating the number of Servers in a Farm according to the number of Users per Farm multiplied by the User-weight per number of Benchmark users. To this there is added a calculated number of redundant Servers for each Farm.

Then a decision block determines whether there are too many servers per individual Farm or not. The Server Farm is established with a given number of Servers and this is checked to see that the estimated availability level will meet or exceed the goals needed for the availability desired.

When this is accomplished, then these recommendations are incremented by an integral factor of "1" after which the number of Farms are incremented by 1. Then, a determination is made whether the number of Farms is greater than 100. If it is not greater than 100, then the return is made to calculate the number of Servers per Farm. Normally this will be greater than 100, after which several steps will involve the redundancy factors in order to display and highlight a recommendation with the least number of total Servers which are divided among the least number of Server Farms. These recommendations can then be either displayed or printed.

BRIEF DESCRIPTION OF THE DRAWINGS

FIG. 3 is a typical drawing of a group of Server Farms which illustrate a typical configuration example.

GLOSSARY LIST OF RELEVANT ITEMS

Figure 1A:
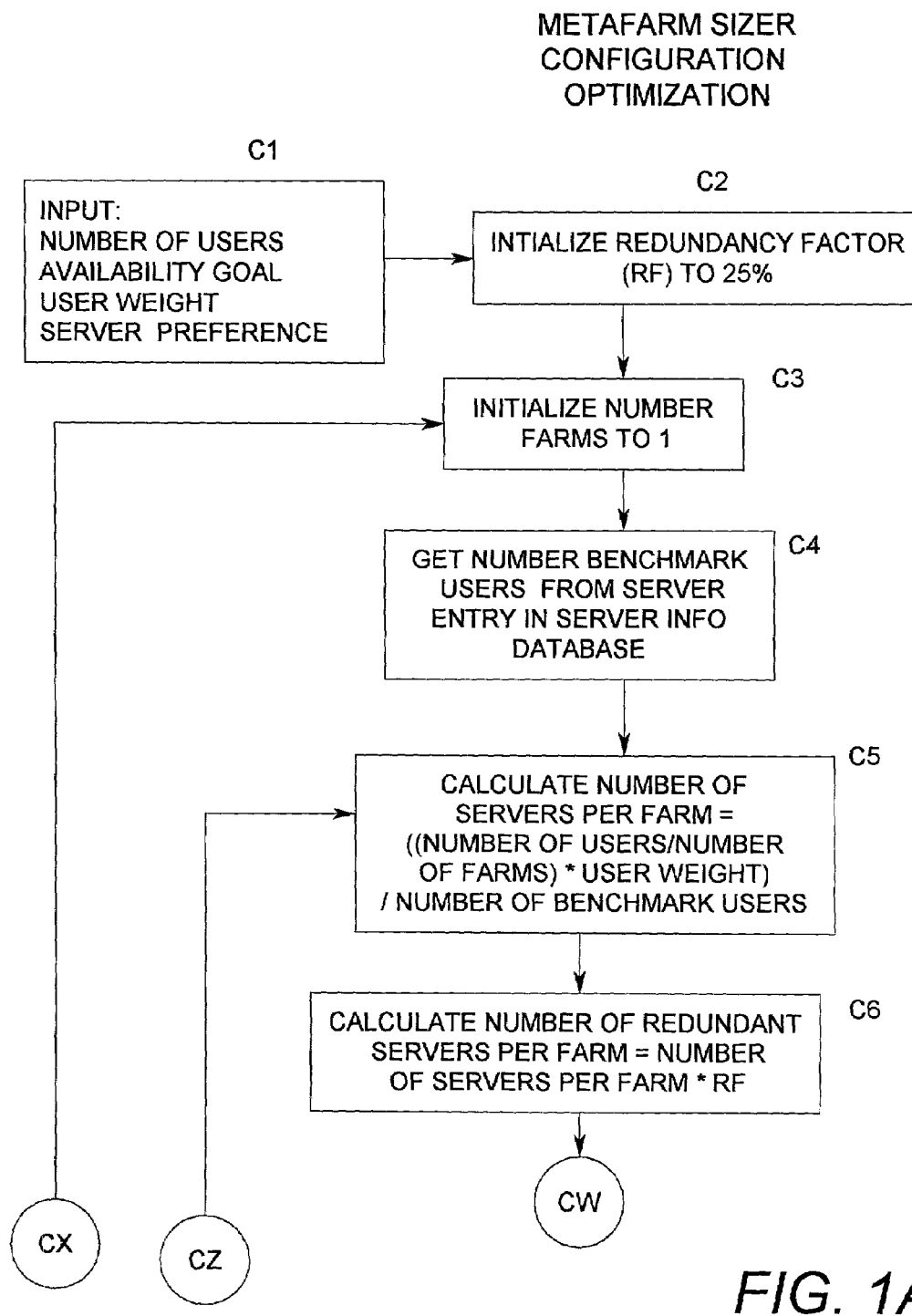
FIGS. 1A and 1B and 1C show a flow chart illustrating methods for configuring and optimizing the size of a Metafarm which is tailored to best specify utilization for the customer's needs.

1. ADJUSTED USER TOTAL (SERVER FARM): The normalized total number of Users that will be supported by the SERVER FARM. Unadjusted Users are grouped into 4 distinct usage-pattern categories, namely (a) Light, (b) Medium, (c) Heavy, and (d) Super Heavy. Calculations are performed on the number of Users in each grouping to determine the normalized number of Users. These normalized numbers are then summed to establish the ADJUSTED USER TOTAL for the entire SERVER FARM.
2. APPLICATION DELIVERY SOLUTION CONFIGURATOR: This is the Unisys approved and recognized designation of the present method and system as defined by this invention. This is a Windows application that helps one in choosing the best-developed Application Delivery (Thin Client) server solution that will meet a client's requirements. This Solution Configurator guides one through a customer interview session where information is gathered in order to develop a set of solutions that will match the customer's performance requirements but also provide different availability levels suitable to the customer-client.
3. APPLICATION SERVER: This is the intended use or responsibility of one of the designated server farms. This type of server farm would run computer programs or pieces of software designed to perform specific multi-user tasks solely within the Windows Terminal Server systems making up the server farm. APPLICATION SERVERS would not be dependent on other back-end servers for the processing of data.
4. APPLICATION TYPE: This is one of four main interview categories used by the described Thin Client Sizer Tool for collecting customer information and collecting also Application Type documents involving the memory and the disk resources typically required when running an application. By supplying the Application Types that will be running—helps to size the Server Farm in order to sufficiently handle the client demand.
5. APPINPUT: GUI-based—This requires limited User input such as an application developed with Microsoft Visual Basic where selections are made from lists or by clicking various options. Text-based—Requires considerable typing by the User such as creating a document in Microsoft Word.
6. APPOUTPUT: Text-based—Indicates the kind of information presented by the application. For example, most Visual Basic or C++ windows and dialog boxes, most uses of productivity apps (Microsoft Office), terminal emulation, etc. Graphic-based—Indicates the kind of information presented by the application. For example, desktop publishing large documents with graphics, Web pages with a lot of picture content (JPEG files), scanned images (TIF files), Microsoft Encarta, etc.
7. APPPROCESSING: Light—Indicates the application executing on the terminal server does little more than present a GUI. For example, a Visual Basic application, the SAP thin client, light use of productivity apps (Microsoft Office), terminal emulation, etc. Heavy—Indicates the application executing on the terminal server uses more processor, memory or disk resource usage. For example, the PeopleSoft Thin Client, Outlook Exchange client, heavy use of productivity apps for complex tasks (desktop publishing, large documents with graphics, extremely large spreadsheets with complex cascading calculations, etc.)
8. AVAILABILITY: This is a measure of the readiness of the system and an application to deliver an expected service to the User with a required performance level. It may be described as a percentage of time that a system and an application are running as distinguished from the system being down for maintenance or repairs.
9. AVAILABILITY GOAL: This is the target service level as defined by the client for the server farm. This data value is input to the tool as a percentage of time that the client expects the systems and applications in the server farm to be accessible by all Users.
10. AVAILABILITY LEVEL TAB WINDOW (FIG. 24 OF Ser. No. 09/813,667): This shows the Availability Calculator which helps to determine solutions that include future/growth potential requirements with a variety of redundancy levels. This screen is interactive and will take input for Adjusted Concurrent number of users, system repair times and redundancy levels. This screen is interactive and will take input for Adjusted Concurrent number of users, system repair times and redundancy levels and returns solution information such as estimated number of servers, # peak users, availability, estimated downtime, # redundant servers and server farm mean time to failure (MTTF).
11. BACKGROUND PROCESSING: The ability of a user-interactive software application to execute processing steps independent of the input and output actions. Background processing would include, but is not limited to, procedures such as 'always on' spell checking in a word processor or 'always on' calculations in a spreadsheet.
12. BENCHMARK: This is test of computer performance and consists of a test or set of tests used to measure the performance of an individual e-Action ES Terminal Server. The output from these tests consists of a value designated as the total number of Users that each e-Action ES Terminal Server system can reasonably sustain and process.
13. BASE SOLUTIONS TAB WINDOW (FIG. 23 OF U.S. Ser. No. 09/813,667: Reports the minimum server configuration recommendation (i.e., not including additional redundancy or growth considerations) for each of the customer Site's server farms. A base solution includes the minimum number of servers and GB RAN required with regard to the Operating system, # processors and MHz available for each server type supported by Unisys.
14. CITRIX METAFRAME: This is computer software from Citrix Systems, Inc., headquartered in Ft. Lauderdale, Fla. This METAFRAME software is loaded onto each Windows Terminal Server and provides superior enterprise-level management and control functions for the e-@ction Enterprise Servers.
15. CITRIX METAFRAME ADD-ONS: ICA Secure and Load Balancing Services are two optional computer softwares that can be run simultaneously with CITRIX METAFRAME on a Terminal Server. ICA Secure provides enhanced network security for METAFRAME. Load Balancing Services allow Citrix MetaFrame to distribute application processing to the plurality of computer systems in a server farm.
16. CONCURRENT USERS: This number is an estimate of the maximum number of users simultaneously processing applications on a Server Farm at any given time. This is characteristically a percentage of the total Benchmark users that can be sustained on all of the e-@ction Enterprise Servers in the Server Farm.

17. CONFIGURATION DATABASE TEMPLATE: This is a collection of data on a computer applied during the information collection process and utilized for the assembly of information collected from window screens.

18. CONFIGURATION SESSION: This is the vehicle used by the described Thin Client Sizer Tool to collect the information on a customer's sizing requirements and to generate the best solution to meet those requirements.

19. CONFIGURATION SESSION DATABASE: This is a collection of data on a computer used for providing information to an instance of the Application Delivery Solution Configurator that enables algorithmic steps and calculations to be applied in the development of an optimized configuration for the Server Farm.

20. CONFIGURATOR: See APPLICATION DELIVERY SOLUTION CONFIGURATOR.

21. CUSTOMER DATA TAB WINDOW (FIG. 22 OF Ser. No. 09/813,667): Reports back to the customer the information that was collected during the interview session and that which the solution generation was based on.

22. CUSTOMER PROFILE: This is a collection of data describing the customer's characteristics and attributes and assembled from the customer interview. This data is input to an algorithm which will output a configuration solution for that particular User or customer.

23. DEFAULT AVAILABILITY: The four (4) SERVER FARM initial availability level scenarios as calculated and displayed by the AVAILABILITY CALCULATOR. The availability levels for the Server Farm are calculated based on the following three parameters: (1) the number of adjusted concurrent users, (2) the system repair time, and (3) the REDUNDANCY FACTOR. For the four DEFAULT AVAILABILITY levels, the first parameter is calculated based on the sizing of the SERVER FARM, and the latter two parameters have pre-configured values, as chosen by the Engineering Group, where the second parameter is held constant at 6 hours and the second parameter is varied from 25% to 10% in decrements of 5%.

24. DISK CAPACITY TAB WINDOW (FIG. 27 OF U.S. Ser. No. 09/813,667: Reports on the disk capacity requirements determined by the interview session input and solution generation algorithms for each of the customer Site's Server Farms.

25. DOWNTIME: The downtime or repair time for a single application server is the time interval required to restore the server and system back to normal business operation. At the end of the repair period, the applications running on the repaired server are available to Users. The downtime for a Server Farm is the time interval required to restore the nominal Server Farm performance.

26. e-@TION ENTERPRISE SERVER (ES): This is the specific name for a plurality of server models marketed and sold by Unisys Corporation. Current models include ES7000, ES5000, and ES2000 systems.

27. ESTIMATOR PROGRAM: This is a program which performs method steps for estimating system parameters such as the availability of an application program to run on any computer or server in the cluster of at least two servers or computers. This type of estimator program was the subject of a co-pending application U.S. Ser. No. 550,603 which is incorporated herein by reference. Another estimator program is the subject of this patent application.

28. ETO: This represents engineering technology optimization and involves an organization located at a specific company location that is devoted to optimizing the performance of the Enterprise-class Windows NT Server platforms.

29. FAILOVER: This is a mode of operation in the system which has two or more servers or computers wherein a failure in one of the servers or computers will result in transfer of operations to the other or another one of the still operating servers and computers. Failover time is the period of time required for successful transfer from a failed server to an operative server.

30. INPUT CHARACTERISTICS: These attributes describe how input is provided to the customer's software applications—through textural typing, through GUI based screen manipulation, or through a combination of both methods.

31. KBPS REQUIREMENTS (SERVER FARM): This is the total data transmission capacity (or bandwidth), measured in kilobytes per second (Kbps), which will be needed for all bi-directional communication between the Users' concurrent connections and the SERVER FARM(s).

32. MB (MEGABYTE): A unit of computer memory or disk storage space equal to 1,048,576 bytes.

33. MEAN TIME TO FAILURE (MTTF): This is the average operating time between two failures, that can be estimated as the total operating time divided by the number of failures.

34. MEAN TIME TO REPAIR (MTTR): This is the average "downtime" in case of failure, that can be estimated as the total downtime divided by the number of failures.

35. MEMORY REQUIREMENTS: This is the necessary amount of server memory used by each User's instance of the multi-user software application.

36. NETWORK CAPACITY TAB WINDOW (FIG. 26 OF U.S. Ser. No. 09/813,667: This is called Network Utilization now; reports on the estimated network activity measured in Kbps for each of the customer Site's Server Farms.

37. OUTPUT CHARACTERISTICS: These attributes describe how output is derived from the customer's software applications—through the display of visual information as text, as graphics, as animated graphics, or as a combination of one or more methods.

38. OPTIMIZATION CRITERION: This is a function that determines the value of one of the essential system attributes and must be minimized (or maximized) by variation of one or more system parameters that are chosen as OPTIMIZATION PARAMETERS. Each optimization parameter should have a predefined domain that defines the values that the optimization parameter may assume. The OPTIMIZATION CRITERION is a focus of an optimum system design or configuration. The examples of the optimization criteria are system performance, system availability, and cost of ownership.

39. OPTIONAL SOFTWARE TAB WINDOW (FIG. 25 OF U.S. Ser. No. 09/813,667: Reports on the additional features/capabilities entered in the interview session regarding the customer's profile for each of the Site's Server Farms. Optional software requirements include such categories as Client Connection Methods, Enhancements, Environment support, Multimedia capabilities, Display characteristics, Protocol support, and Server Enhancements.

40. PROCESSING CHARACTERISTIC: This attribute describes whether the customer's software application performs extensive BACKGROUND PROCESSING, independent from the processing of application input and output.

41. REDUNDANCY FACTOR (Rf): This is a measure of the additional number of Users that can be added to the nominal number of Users per server without exceeding the maximum number of Users per server (server performance benchmark maximum of Users). It is a difference between maximum and nominal performance as a percentage of the maximum performance. The Redundancy Factor can be calculated as 100 percent minus a usage factor Uf.

42. SERVER CONFIGURATION REPORT: This is a report generated by the Thin Client Sizer Tool that will contain the information on the optimum server configurations as determined by the customer information which was collected during the Configuration Session and the performance benchmarking results.

43. SERVER FARM: This is one of the five main interview categories used by the Thin Client Sizer Tool for collecting customer information. A Server Farm consists of one or more Windows Terminal Servers configured together for unified administration, security, and for communication services. For instance, two Server Farms might be required for certain applications such as the PeopleSoft clients, or one server for a Payroll function, and another server for a Human Resources function.

44. SERVER FARM AVAILABILITY CALCULATOR: This is an estimator program that estimates the availability for the Server Farm.

45. SERVER FARM OVERFLOW: The condition whereby the results of calculations on the number of servers in a SERVER FARM, during the Solution Generation phase, exceeds the maximum number of servers recommended for a SERVER FARM as determined by the Engineering Group.

46. SERVER INFORMATION DATABASE: This is a collection of data on a computer for holding benchmark and informational data on a plurality of Unisys Enterprise Server systems. This data is used by the Thin Client Sizing Tool in determining the optimum server farm configuration to meet the customer's sizing requirements.

47. SITE: This is one of the five main interview categories used by the Thin Client Sizer Tool for collecting customer information. A Site is the physical location where the Windows Terminal Servers will be located in particular cities such as, New York, Los Angeles or Chicago, etc. and the number of users at that physical location.

48. SITE/SERVER FARM PAIR: This is a defined combination of a specific Server Farm residing within a particular physical location. As defined during the customer interview, each physical location, or site, can contain one of more Server Farms. When defining the User and Application characteristics of each Server Farm within the site, each individual combination is considered as an independent pair.

49. SIZING DATABASE: This is a collection of data on a computer output from the THIN CLIENT SEVER FARM AVAILABILITY CALCULATOR and used for storing the number of e-@ction Enterprise Server unit modules and their availability levels.

50. SOLUTION CONFIGURATOR: See APPLICATION DELIVERY SOLUTION CONFIGURATOR.

51. SOLUTION GENERATION: The act of producing a particular SERVER FARM configuration (i.e. the SOLUTION) that will meet the sizing and availability requirements of a client. This SOLUTION will be comprised of an appropriate number of servers, proper disk space and memory to meet the client requirements.

52. THIN CLIENT SERVER FARM AVAILABILITY CALCULATOR: This is one of the examples of the SERVER FARM AVAILABILITY CALCULATOR. Because Thin Client configurations are intended to make applications available to multiple Users at the same time, this calculator calculates the availability of a specified number of instances of an application (not just a single instance) where each application instance is being run at the server, but all the User input response is taking place at the client terminal. In this scenario, downtime occurs whenever the number of available instances of the application drops below the required specified number of instances.

53. UCON32: This is the unit designated as the Unisys Configurator which is an extensive on-line configuration tool which is used to support all Unisys Corporation system platforms.

54. USAGE FACTOR (Uf): This is the ratio of the nominal number of Users per server to the maximum number of Users per server (server performance benchmark maximum of Users) times 100 percent.

55. USER-TYPE: This is one of the five main interview categories used by the Thin Client Sizer Tool for collecting customer information. A User-Type embodies the usage patterns of a particular group of Users. User usage patterns will have a significant impact on performance. The area which is considered here is the user's typing speed. Some examples of User-types are, order entry clerks, secretaries, developers, and technical writers.

56. USER WEIGHT: This is the estimated average user impact (light, medium, heavy or super heavy) on the Windows Terminal Server, and a value is assigned to each User Type by the sizing tool. Such User attributes as typing speed or application familiarity can all affect this parameter. It is used to approximate the amount of server processor usage that is imposed by the different User Types.

57. WINDOWS TERMINAL SERVER: This is the designation for an e-@action Enterprise Server that is running one of two operating systems sold and supported by Microsoft Corporation: (1) Windows NT Server 4.0, Terminal Server Edition, or (2) Windows 2000 (Server, Advanced Server, or Datacenter Server) with the optional Terminal Services service enabled in Application Server mode.

DESCRIPTION OF PREFERRED EMBODIMENT

Figure 2:
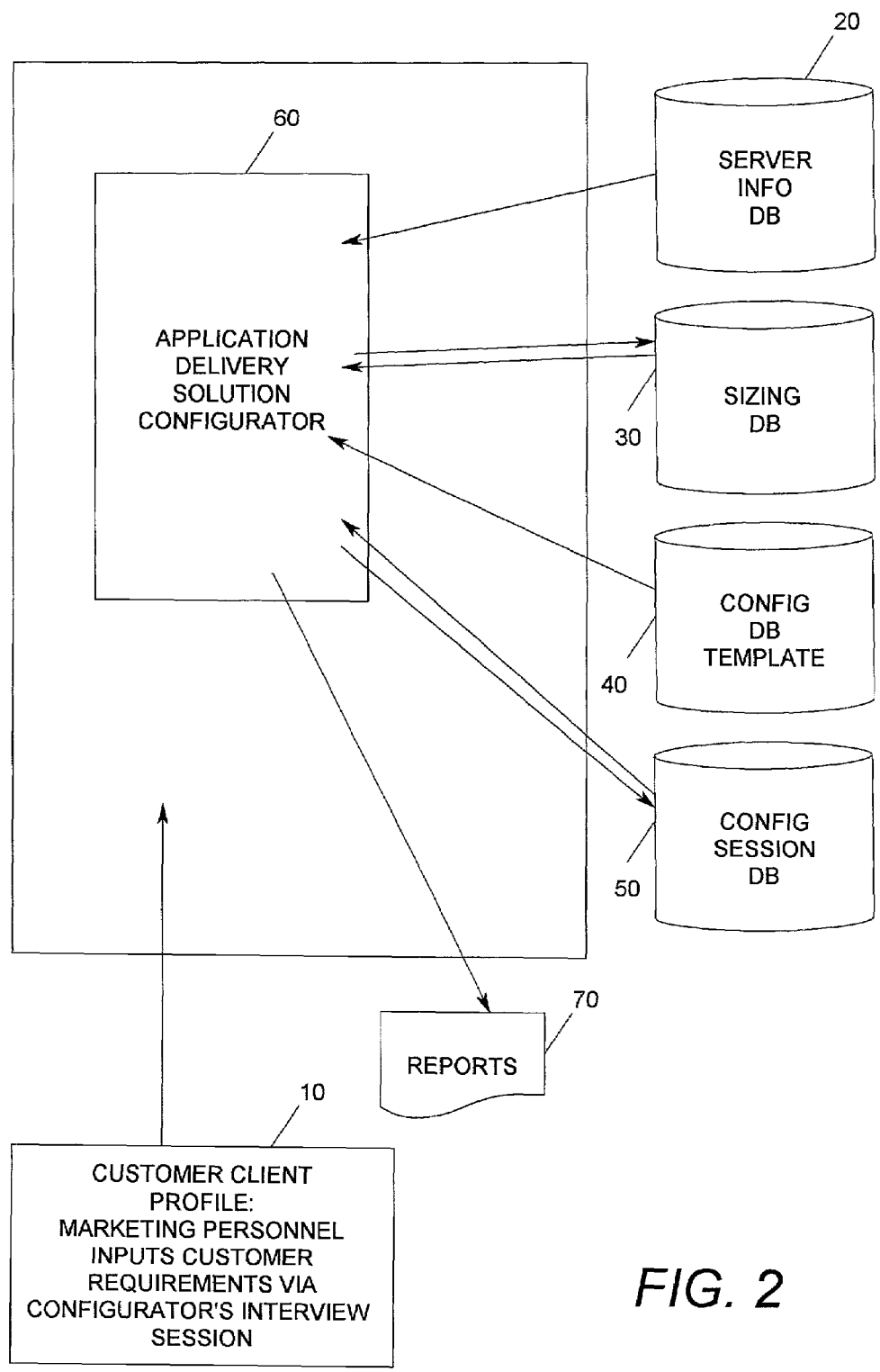
FIG. 2 is a drawing showing the environment of the Thin Client Sizing Tool.

FIG. 2 is an environmental drawing to illustrate the basic modular arrangement involved in the present Application Delivery Solution Configurator used in the Thin Client Sizing Tool. The data accumulation and customer-client information are indicated as being developed as the customer-client profile 10. The methods and the algorithmic steps involved are provided for by the block designated as the Application Delivery Solution Configurator 60.

Also available for input to the configurator program 60 is a Server information database 20 and the configuration database template 40. Then additionally collected for two-way information transmission is the sizing database 30 and the Configuration Session Database 50.

The customer-client profile information 10 and other applicable information residing in the databases 20, 30, 40 and 50, are attached for inter-working with the Application Delivery Solution Configurator 60, after which, when all the subsequent algorithmic steps are effectuated, then there will be a report unit 70 in which the optimum solution information is provided to the designer and the client-customer to indicate an optimized solution for the customer's enterprise or operating situation.

FIG. 3 is an example of a particular type of configuration known as a Server Metafarm 8. The Metafarm 8 may include a number of Server Farms designated as 10A, 10B, 10C . . . 10K. Each of the Server Farms will be seen to have a disk database server 12A, 12B . . . 12K, and a series of application programs with hardware servers. For example, Server Farm 10A will have a disk database server 12A, which is attached to a series of application programs 10P, 20P, and AN. Each of these programs is associated respectively with a particular hardware server A1, A2 and AN.

Similarly, each one of the Server Farms, for example, such as the Server Farm 10K will also have a disk database server 12K and a series of hardware servers K1, K2, and KN, each of which has application programs designated as K1, K2 and KN.

A network 60 provides bus interconnection from each of the hardware servers with their application programs over to a series of client terminals 1, 2, . . . L.

The Thin Client Sizer Tool is a Graphical User Interface (GUI)-based application which is used to specify a list of Server configurations that best satisfy a particular customer's requirements for deployment of a Windows Terminal Server, and including Citrix MetaFrame software.

In order to help a designer or supplier support a customer to develop an optimum configuration for their large user group (or Metafarm), which can be configured to optimize the services to be provided to the customer or user, a very specific set of information referred to as the "Customer Profile" is first developed and placed in a Configuration Session Database 50. This Customer Profile development was described in co-pending U.S. Ser. No. 09/813,671, entitled "CONFIGURATION INTERVIEW SESSION METHOD FOR THIN CLIENT SIZING TOOL" and is incorporated by reference herein.

In conjunction with the interview process, the option is available to a customer to obtain assistance in subdividing their large site into reasonably-sized Server Farms. The present method can be used during or prior to the interview process to systematically determine the most efficient subdivision recommendation for the customer. Once this subdivision is determined, the configuration interview session is then resumed for further development of the user and application type attributes of the customer's users that are pertinent to configuration sizing. Once this information has been developed, it is placed in the Configuration Session Database (as seen in the co-pending application, U.S. Ser. No. 09/813,671. The present method will be seen in FIGS. 1A and 1B and 1C and described herein together with some specific numbers and parameters which will further illustrate how the particular algorithm is developed. Here, the series of steps in the flowchart of FIGS. 1A, 1B, 1C, will be designated by various markers, such as C1, C2, C3, etc., through C20.

Metafarm sizing for configuration optimization in FIG. 1A, is entered from the Configuration Interview Session described in co-pending U.S. Ser. No. 09/813,671. Initial default values for the required Input step (C1) are programmatically entered initially by the configurator as seen in Table I, which will illustrate a typical example.

TABLE I

| Input | Description of Default Input Values |
|---|---|
| # Users | The Site's # of users that have not yet been assigned to a particular Server Farm |
| Availability Goal | 99.99% = 0.9999 |
| User Weight | Heavy User (i.e., benchmark user) |
| Server Preference | The server type which is recommended by Engineering |

Using a simple example, it is assumed that the number of users defined for the customer Site is 50,000 users and that none of the users have yet been assigned to Server Farms. The default Availability Goal percentage is set at 99.99% which equates to an estimated 54 minutes per year of downtime. The default user "weight" is "Heavy" which corresponds to the weight of a typical benchmark user. The default server preferred is one that is recommended by the Engineering team to currently be the most marketable at the present time. Presently chosen here is the Unisys Corporation's Server designated ES7000-4x (700 MHz) and this server is used as the default in this example.

Once the default input is determined at C1, the redundancy factor variable, RF, is initialized to 25% or 0.25 at step (C2) and then the number of Farms is initialized to 1 at step (C3). At step C4, the Server Info Database 20, FIG. 2, is read to obtain the number of benchmark users (in this case, for example, it reads to be 140 users) for the preferred server. This server information is supplied by an engineering team as a result of running benchmark tests on the server.

Then, a calculation is made to determine the number of servers required per farm, step (C5) using the following formula:

Servers per Farm:

$$[EQ1] = ((<\#Users>/<\#Farms>)*<User\ Weight\ Factor>)/$$
$$<\#Benchmark\ users>$$
$$= ((50000/1)*1)/140$$
$$= 50000/140$$
$$= 358\ Servers\ per\ Farm$$

[where * = a multiplying factor, / = a division sign]

The User weight factor is also gleaned from the Server Info Database 20, FIG. 2, on a server basis to determine how a user compares to a benchmark user. A Heavy user is customarily considered the same weighting factor as a benchmark user therefore making its factor =1. A "Light" user, however, would be considered to use 50% of the system resources as a benchmark user. The following Table II is a mapping for customary user weight factors with respect to a typical benchmark user.

TABLE II

| User weighting factors | | |
|---|---|---|
| Light users | = | 50% of a benchmark user |
| Medium users | = | 67% of a benchmark user |
| Heavy users | = | 100% of a benchmark user |
| Super Heavy users | = | 200% of a benchmark user |

Thus, the number of Servers per Farm is determined to be 358. Next, the calculation is made to determine the number of Redundant Servers per Farm of step (C6) using the initial redundancy factor, RF=25%, in the following formula:

Redundant Servers per Farm $$[EQ2] = <\text{Servers per Farm}> * RF$$
$$= 358 * 0.25$$
$$= 89 \text{ Redundant Servers per Farm}$$

[where * = a multiplication sign]

Figure 1B:
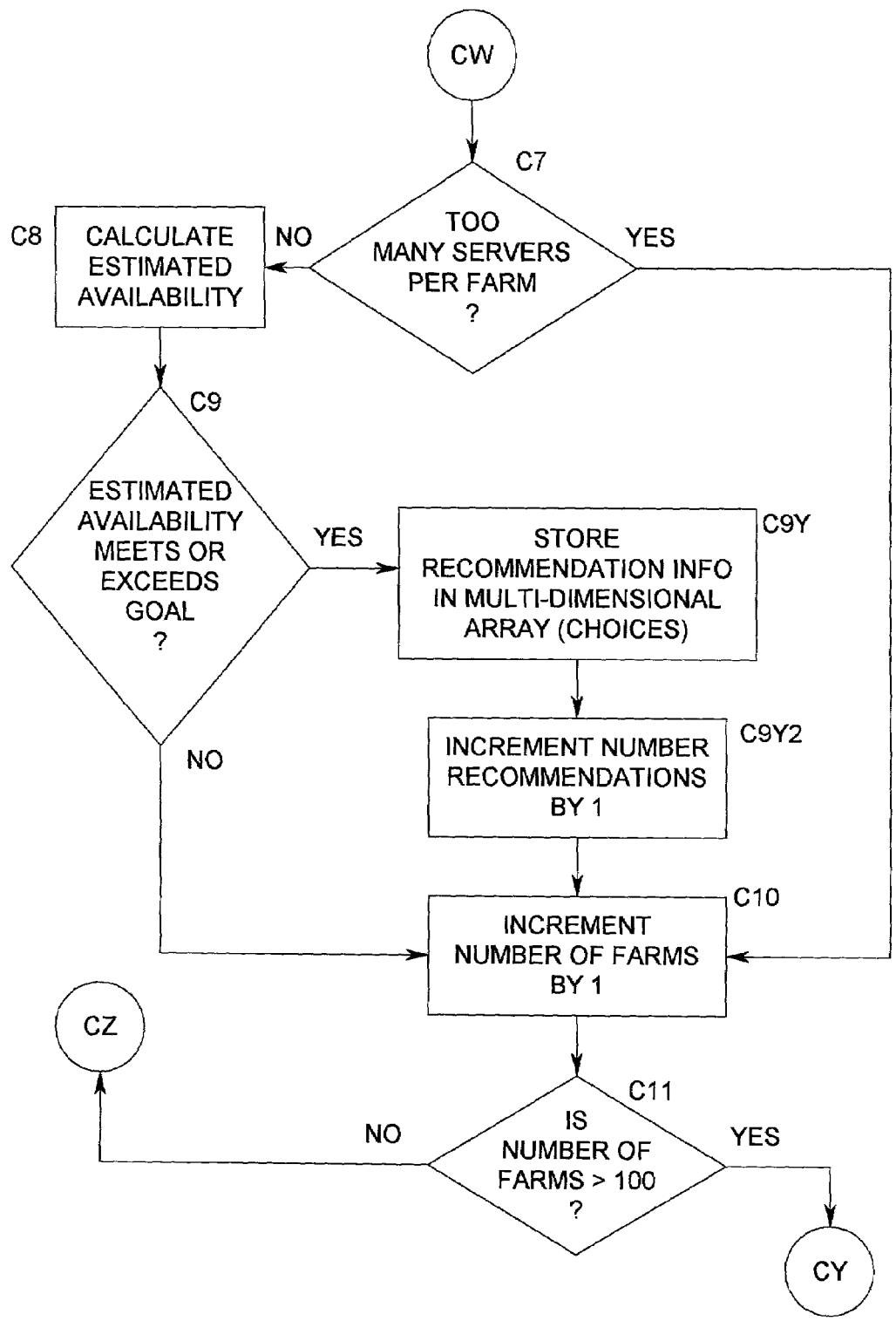

Then C6 continues via connecting marker CW over to step C7 on FIG. 1B.

The decision block at C7 is then made as to whether the total number of Servers per Farm is more than the recommended maximum of 160 Servers per Farm at step (C7). This number is determined by the engineering team based on overflow conditions when estimating availability with MTTF calculations and common sense with regard to the cost of manageability. The total number of recommended Servers per Farm is then calculated using the following formula:

Total #Servers per Farm $$[EQ3] = <\text{Servers per Farm}> + <\text{Redundant Servers per Farm}>$$
$$= 358 + 89$$
$$= 447 \text{ Recommended Servers per Farm}$$

So, at step C7, the answer is "YES", since there are too many Servers per Farm because 447 is greater than 160, (447>160). The sequence flow (YES) at step C7 then skips down to step (C10), where the #Farms variable is now incremented from 1 to 2.

Now, the decision block question at step C11 is asked "Is the number of Farms greater than 100?" (C11) and is answered "NO" at this juncture. Then the flow continues back to step C5 where the Number of Servers per Farm is calculated to be ((50000/2)*1)/140=179 Servers per Farm using [EQ1]. Then the Redundant Servers per Farm is calculated at step (C6) to be 179*0.25=44 using [EQ2] which used in [EQ3] to calculate the Total # of Servers per Farm of 179+44=223. This number is still greater than the maximum number of servers per farm which causes another iteration involving the number of server farms being incremented at step (C10) so that 2+1=3 Server Farms are considered. This iteration shows the total number of Servers per Farm=((50000/3)*1)/140=120 [EQ1] and the number of Redundant Servers per Farm (C6)=120*0.25=30 [EQ2]. This time, the total number of Servers per Farm (C7) calculates to 120+30=150 [EQ3] which is less than 160 so the answer to step (C7) on "Are there too many Servers per Farm?" is answered "NO" (less than 160) and then the Estimated Availability is calculated at step (C8) to be 99.99985229% (as per co-pending U.S. Ser. No. 09/443,926) which provides details on the formula for estimating availability). The Estimated Availability calculation requires the following inputs:

1. Number of Servers per Farm.
2. Number of Redundant Servers.
3. Server Benchmark testing results for the preferred Server's Mean Time To Failure (MTTF)=1200 hours (which is stored in the Server Info Database of FIG. 2, element 20).
4. Mean Time to Repair (MTTR) of 6 hours.
5. Number of Server Farms involved.

After the Estimated Availability Level is determined, the decision then needs to be made, at step (C9), "Does the Estimated Availability Level meet or exceed the Availability Goal?". The Availability Goal was described as input and had been defaulted to 99.99% so, as the decision value at step C9 is "YES", it meets/exceeds the Availability goal. Here, the parameters for this recommendation are temporarily placed into the multi-dimensional array slot indexed by the #Recommendation of a multi-dimensional array named Choices (C9Y). The parameters stored in the Choices array at C9Y for this recommendation include: Number of Farms; Users per Farm; Estimated Availability Level; Estimated Downtime of Farm; Total Number of Servers per Farm; and Total Number of Redundant Servers per Farm. The C9Y #Recommendations index is then incremented by 1 at (C9Y2).

The #Farms (number of Farms) is incremented from 3 to 4 at step (C10) and since the number of Farms is still not greater than 100, "NO" is answered at step (C11), then the next updated recommendation is calculated at step (C5) thus dividing the Users into farms via steps (C5) to (C8). If the Estimated Availability Level at step (C9) meets or exceeds the Availability Goal (YES), the Estimated Availability Level is stored in the Choices array at the index #Recommendations step (C9Y). The #Recommendations (C9Y2) and incremental #Farms (C10) are both incremented by 1. This loop sequence continues until #Farms is incremented to be more than 100 at which time "YES" is the answer at step (C11) to "Is #Farms>100?" (C11).

Figure 1C:
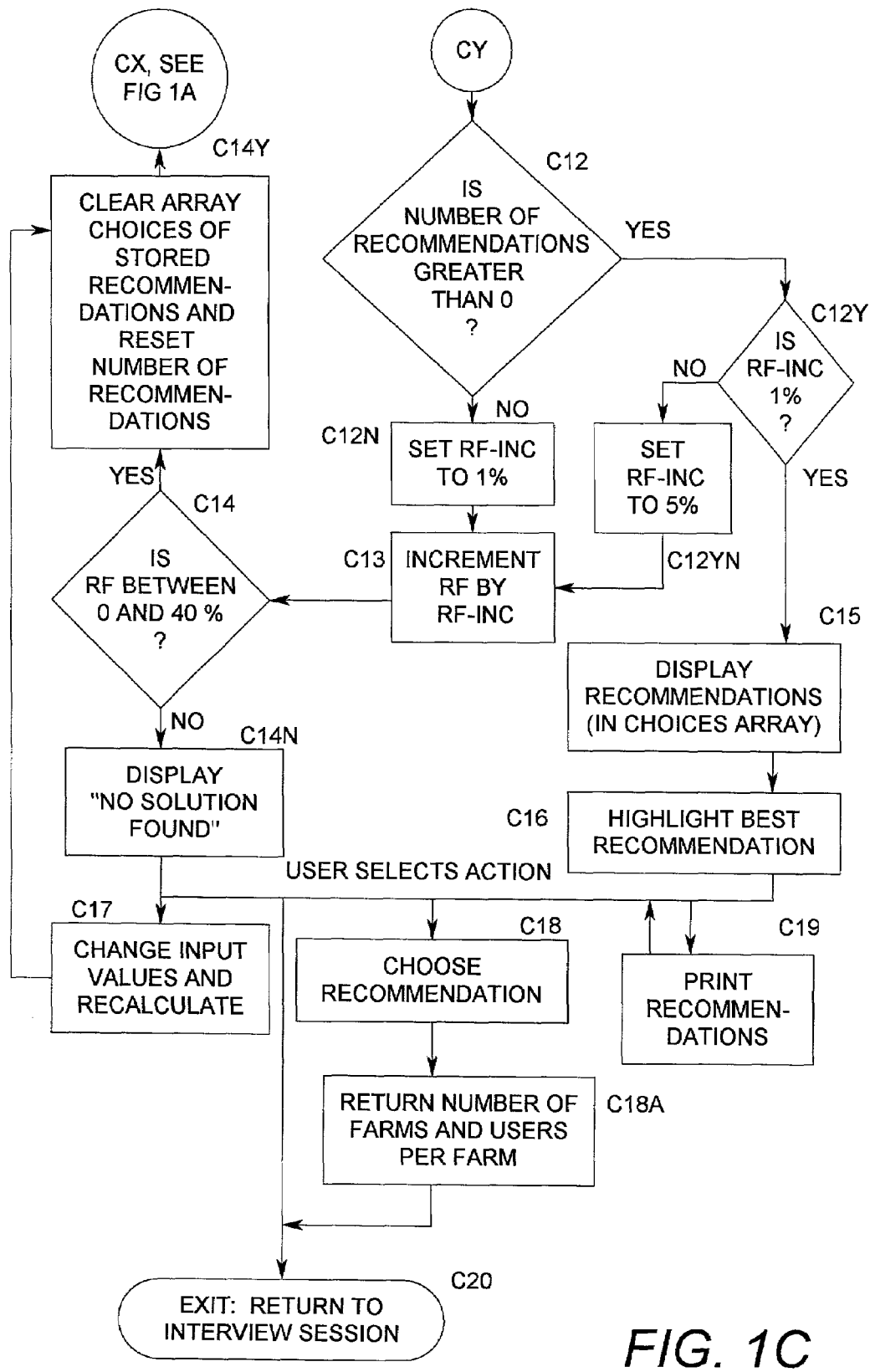

The "YES" leg of C11 continues via marker CY over to FIG. 1C. The "NO" leg of C11 continues via marker C2 over to FIG. 1A.

At this point, the Choices array (C9Y) will contain all of the recommendations that: 1) didn't exceed the maximum number of Servers per Farm (of 160), and 2) had an Estimated Availability that met or exceeded the Availability Goal (which is 99.99%).

The Choices array at step C9Y will have the following recommendation entries as seen in Table III.

TABLE III

Recommendation Choices for Redundancy Factor = 25%

| Index | # Farms | Users per Farm | Estimated Availability | Estimated Downtime (hrs/yr) | Redundant Servers | Total Servers |
|---|---|---|---|---|---|---|
| 0 | 3 | 16666 | 99.99986% | .01 | 90 | 450 |
| 1 | 4 | 12500 | 99.99998% | 0 | 88 | 448 |
| 2 | 5 | 10000 | 99.99999% | 0 | 90 | 450 |
| 3 | 6 | 8333 | 99.99999% | 0 | 90 | 450 |
| 4 | 7 | 7142 | 99.99999% | 0 | 91 | 455 |
| 5 | 8 | 6250 | 99.99997% | 0 | 88 | 448 |
| 6 | 9 | 5555 | 99.99996% | 0 | 90 | 450 |
| 7 | 10 | 5000 | 99.99993% | .01 | 90 | 450 |
| 8 | 11 | 4545 | 99.99982% | .02 | 88 | 451 |
| 9 | 12 | 4166 | 99.9995% | .04 | 84 | 444 |
| 10 | 13 | 3846 | 99.99966% | .03 | 91 | 455 |
| 11 | 14 | 3571 | 99.99864% | .12 | 84 | 448 |
| 12 | 15 | 3333 | 99.9991% | .08 | 90 | 450 |

TABLE III-continued

Recommendation Choices for Redundancy Factor = 25%

| Index | # Farms | Users per Farm | Estimated Availability | Estimated Downtime (hrs/yr) | Redundant Servers | Total Servers |
|---|---|---|---|---|---|---|
| 13 | 16 | 3125 | 99.99483% | .45 | 80 | 448 |
| 14 | 17 | 2941 | 99.99564% | .38 | 85 | 459 |
| 15 | 18 | 2777 | 99.99718% | .25 | 90 | 450 |

The next decision block (at step C12) is required to determine "Is #Recommendations>0?" (C12), which indicates whether or not there are some recommendations that will meet the customer's criteria. If the answer at (C12) is "YES", the Redundancy Factor increment variable, RFinc, which initially defaulted to 0, is checked so that "Is RFinc 1%?" is checked at step (C12Y), to which the answer here is "NO", and the RFinc variable is set to −5% which equates to −0.05 (C12YN). The Redundancy Factor, RF, is incremented by RFinc (C13) (decremented from 25% to 20%), that is a 5% decrement.

The redundancy factor RF is checked as a query at step (C14) so that the decision block "Is RF between 0 and 40%?" (C14) is checked. When answered here as "YES", the Choices array (C14Y) is "cleared" and the #Recommendations variable is reinitialized to 0 at (C14Y).

Then calculations via marker Cx, (in steps C3 to C11) are redone using the new redundancy factor, dividing the Users among 1–100 farms and the Choices array (C14Y) is refilled with recommendation information for all the recommendation choices that didn't exceed the maximum number of Servers per Farm (of 160), and that had an Estimated Availability Level that met or exceeded the Availability Goal (which is 99.99%).

After the calculations are redone using the new Redundancy Factor, the recommendation choices have been narrowed down to a more optimal configuration recommendation. At this point, the Choices array (C14Y) will have the following recommendation entries shown in Table IV:

TABLE IV

Recommendation Choices for Redundancy Factor = 20%

| Index | # Farms | Users per Farm | Estimated Availability | Estimated Downtime (hrs/yr) | Redundant Servers | Total Servers |
|---|---|---|---|---|---|---|
| 0 | 3 | 16666 | 99.99899% | .09 | 72 | 432 |
| 1 | 4 | 12500 | 99.99985% | .01 | 72 | 432 |
| 2 | 5 | 10000 | 99.99984% | .01 | 70 | 430 |
| 3 | 6 | 8333 | 99.99986% | .01 | 72 | 432 |
| 4 | 7 | 7142 | 99.99965% | .03 | 70 | 434 |
| 5 | 8 | 6250 | 99.99962% | .03 | 72 | 432 |
| 6 | 9 | 5555 | 99.99935% | .06 | 72 | 432 |
| 7 | 10 | 5000 | 99.99953% | .13 | 70 | 430 |
| 8 | 11 | 4545 | 99.99952% | .39 | 66 | 429 |
| 9 | 12 | 4166 | 99.99725% | .24 | 72 | 432 |
| 10 | 14 | 3571 | 99.99147% | .75 | 70 | 434 |

The next decision block at step (C12) is required to determine "Is #Recommendations>0 ?" (C12) indicating whether or not some recommendations exist that will meet the customer's criteria. If the answer is "Yes", the redundancy factor increment variable Rfinc, which is currently −5%, is checked and asked "Is RFinc 1%"(C12Y) to which the answer is "NO" and the RFinc variable is reset to −5% at (C12YN). And the redundancy factor, RF is incremented by RFinc (C13) resulting in the redundancy factor being decremented from 20% to 15%.

The redundancy factor RF is checked at step (C14) so that "Is RF between 0 and 40%?" (C14) so that the algorithm ensures that a reasonable redundancy factor is maintained. A maximum redundancy of 40% is determined by engineering to be ample. When answered "YES", the Choices array (C14Y) is cleared and the #Recommendations index variable is reinitialized to 0 (C14Y).

Then calculations (in steps C3 to C11) are redone using the new Redundancy Factor, dividing the users among 1–100 Farms and the Choices array is refilled with recommendation information for all recommendation choices that didn't exceed the maximum number of Servers per Farm (of 160), and had an Estimated Availability that met or exceeded the Availability Goal of 99.99%.

After the calculations are redone using the latest Redundancy Factor of 15%, the recommendation choices have now been further narrowed down in search of the most optimal configuration recommendations. At this point, the Choices array in Table V will have the following recommendation entries:

TABLE V

Recommendation Choices for Redundancy Factor = 15%

| Index | # Farms | Users per Farm | Estimated Availability | Estimated Downtime (hrs/yr) | Redundant Servers | Total Servers |
|---|---|---|---|---|---|---|
| 0 | 3 | 16666 | 99.99107% | .78 | 54 | 414 |
| 1 | 4 | 12500 | 99.99608% | .34 | 52 | 412 |
| 2 | 5 | 10000 | 99.99484% | .45 | 50 | 410 |
| 3 | 6 | 8333 | 99.99668% | .29 | 48 | 414 |

Again, the decision block at step (C12) required to determine "Is #Recommendations>0?" (C12) indicates whether or not some recommendations exist that will meet the customer's criteria. Here, the answer is again "YES", as there are four acceptable recommendations, and the Redundancy Factor increment variable, RFinc, (which is currently −5%) is checked at (C12Y)—"Is RFinc 1%?" (Cl2Y) to which the answer here is "NO", and the RFinc variable is then reset to −5% which equates to −0.05 (Cl2YN), and the Redundancy Factor, RF, is incremented by RFinc (C13) resulting in RF being decremented from 15% to 10%.

The Redundancy Factor RF is checked (C14) so that the decision query "Is RF between 0 and 40%?" (C14). The answer is again YES", so that the Choices array (C14Y) is cleared and the #Recommendations variable is reinitialized to 0 (C14Y). Then the calculations (in steps C3 to C11) are redone using the new Redundancy Factor, and dividing the users among 1–100 Farms. Now using the Redundancy Factor of 10%, all recommendations either exceeded the maximum number of Servers per Farm (of 160) or had an Estimated Availability Level that met or exceeded the Availability Goal. There are no useful recommendations here and the step C12 query "Is #Recommendations>0?" (C12) is answered "No" this time.

Here again, then the RFinc variable is set to 1% (Cl2N), and the Redundancy Factor RF is incremented by RFinc changing from 10% to 11%. The loop (at steps C5 to C14) is reiterated for Redundancy Factors of 12% and 13%, each time resulting in no acceptable recommendations being found. However, when the Redundancy Factor is set to 14%, the calculations result in three acceptable recommendations and the internal Choices array contains the following recommendation entries, as shown in Table VI:

TABLE VI

Recommendation Choices for Redundancy Factor = 14%

| Index | # Farms | Users per Farm | Estimated Availability | Estimated Downtime (hrs/yr) | Redundant Servers | Total Servers |
|---|---|---|---|---|---|---|
| 0 | 4 | 12500 | 99.99231% | .67 | 48 | 408 |
| 1 | 5 | 10000 | 99.99484% | .45 | 50 | 410 |
| 2 | 6 | 8333 | 99.99031% | .85 | 48 | 408 |

Now at step (C12, FIG. 1C), the decision block question "Is the #Recommendations greater than 0?" is answered "YES", as well as the question "Is your RF increment 1%?" step (C12Y) to which a "YES" indicates that the optimum redundancy factor has been found. The information in the Choices array step (C14Y) is then displayed in the Metafarm Sizer Server Farm Subdivision Recommendations grid on the User's PC screen at step (C15). The column of the recommendation that has the least number of total servers is highlighted at step (C16) to indicate the sizer's best recommendation (C16).

In the event that more than one recommendation has the least number of total servers, the best recommendation is made between those choices to the choice divided among the "least number" of Server Farms (with the idea that this is the easiest to manage). The algorithm sequence then waits for further user action. It will be noted that Table VI at Index 0 with four (4) Server Farms would be considered as the best recommendation.

If at step (C14) the question is asked "Is the RF between 0 and 40%?" (C14) and the answer is "NO", it is determined that no acceptable recommendation is available for that number of users and the message "NO SOLUTION FOUND" is displayed at step (Cl4N) in place of the Server Farm Subdivision Recommendations Grid at step C15.

The User is then required to make an optional choice on the next action of the Sizer program algorithm. The options include the following:

1. Changing the input values and recalculating the recommendations (C17) and clearing the Choices array and reinitializing the #Recommendations and #Farms (C3) variables. The server preference benchmark information is retrieved at step (C4) and the calculation loop begins (C5) to find the next optimum configuration with regard to the current input parameters.
2. Selecting a recommendation column via step C18 in the Sizer's Server Farm Subdivision Recommendation Grid and returning the #Farms and Users per Farm (C18A) for use in the Interview Session as shown in co-pending U.S. Ser. No. 09/813,671, for information for the methods used on the Configurator Interview Session). The algorithm is then exited (C20).
3. Printing the Server Farm Subdivision Recommendations Grid (C19) which returns the algorithm back to the set of options available.
4. Exit the algorithm without returning/choosing a recommendation (C20).

Described herein has been a method for optimizing Metafarms in a Thin Client Sizing Tool. By taking into account the number of Users involved, the type of Servers deemed reliable, the desired availability level of the Servers which will minimize downtime and repair time, the optimum allocation of Servers to each Server Farm, and the optimum Redundancy Factor which will provide extra Servers to each Farm for back-up purposes, then a final set of output results are provided which provide several choices or options to the customer for his enterprise development.

While one preferred embodiment of the invention has been described above, there may be other implementations and embodiments which are still encompassed by the attached claims.

What is claimed is:

1. In a Thin Client Sizing Tool, a method for developing a Metafarm having an optimal number of Server Farms to provide recommended configurations meeting certain specified parameters, wherein a number of factors are established which include: (i) the total number of users who will be using the Metafarm; (ii) an Availability goal which indicates the percentage of time that the systems and applications in each Server Farm will be accessible to all the users involved; (iii) assigning a user weight volume to each type of user to indicate estimated average usage or light, medium, heavy or super heavy; (iv) calculating the number of servers to be assigned to each Server Farm and which will fulfill the said Availability goal; (v) calculating the number of redundant servers per Server Farm needed to provide maximum performance over and above the average nominal performance while still fulfilling said Availability goal; (vi) seeking to find the minimum number of Server Farms which still provide an optimum Redundancy Factor of extra servers which will still fulfill the desired Availability goal, comprising the steps of:

(a) delivering input data on the total number of users to be serviced, the Availability goal to be achieved, the User-weight utilization factors involved, and the preferred Server types to be used;
(b) sequencing a series of calculations to determine the number of Servers per Farm and the number of redundant Servers per Farm which match or exceed the said Availability goal;

and wherein data on Benchmark operational parameters are consulted on a specific type of server to establish the maximum number of users which can be supported by said chosen specific type of server, and wherein step (b) includes the steps of:

(b1) retrieving a Benchmark parameter which indicates the maximum number of users which can be serviced by a chosen Server type;
(b2) calculating a preliminary number of such chosen Servers which will constitute a Server Farm; and wherein a desired Redundancy Factor is used to add enough extra servers, designated as a number of redundant servers per farm, to enable maximal user usage over nominal user usage and wherein an estimated Availability Level is set for each chosen Server Farm, and wherein step (b2) includes the steps of:

(b2a) calculating the number of redundant Servers per Farm according to a preliminary set percentage parameter for the Redundancy Factor;
(b2b) calculating the estimated Availability Level for the Server Farm chosen;
(c) displaying a set of recommendations which show the minimum number of Server Farms which have the optimum redundancy factor and meet the values needed for the Availability goal.

2. The method of claim 1 wherein a desired Availability Level goal of a certain maximum downtime value is checked to see if it meets said Availability Level goal according to the number of Server Farms first estimated and the number of servers-per-farm first estimated, and the number of redundant servers-per-farm first estimated, and wherein step (b) includes the steps of:

(b3) if step (b2b) Availability Level does not meet or exceed the Availability Level goal, then initiate a sequential loop by either incrementing or decrementing the number of Server Farms to re-calculate the number of Servers per Farm and number of redundant Servers per Farm which meet or exceed the Availability Level goal.

3. The method of claim 2 wherein there is accommodated a Redundancy Factor indicating the possible number of extra users which can be accommodated in a Server Farm which is added to the nominal number of users-per-server without exceeding the maximum allowable users-per-server set by benchmarking data, and wherein correlation is made between the number of users-per-Server Farm, the number of servers and the estimated Availability Level for each Server Farm and wherein there is established the total number of servers in the entire Metafarm of server farms, such that step (b) includes the steps of:

(b4) decrementing the Redundancy Factor until no acceptable recommendations are available;

(b5) incrementing the Redundancy Factor in steps of 1% to find the optimum Redundancy Factor;

(b6) storing configuration recommendations in an array indicating output displays of the number of Servers correlated to the number of Users per Farm with the estimated Availability Level, estimated yearly downtime, number of redundant Servers in the Metafarm and the total number of Servers in the Metafarm.

4. In a Thin Client Sizing tool, a method for optimizing the number of Server Farms to provide the most efficient recommended configurations which provide a desired Availability Level goal and Redundancy Factor, wherein data is accumulated as to the number of Users to be involved, the Availability goal of maximum downtime permitted, and the usage weight load by each type of user; the number of servers to be utilized in each Farm, plus the number of redundant servers to be placed in each Server Farm to allow performance service beyond the nominal usage; utilizing an experienced benchmark value for types of servers involved to ensure that the number of servers-per-farm does not exceed the appropriate benchmark value for the type of server involved; providing a calculated Availability Level for the maximum allowable downtime which meets the downtime goal for Availability Level; reporting out a number of output recommendations which correlates sets of parameters which link the number of farms with the number of users-per-farm with the Estimated Availability, with the Estimated Downtime, with the number of Redundant Servers, and with the Total Number of Servers in order to select that set of parametric criteria which best fulfill a selected customer's requirements, comprising the steps of:

(a) inputting of data to indicate the number of users involved, the Availability goals, the user-weight factors, and preferred server types;

(b) calculating the number of Servers per Farm to be utilized;

(c) calculating the number of redundant Servers to be placed in each Server Farm;

(d) using a benchmark to check if the number of Servers per Farm from steps (b) and (c) exceed the benchmark values for the Servers involved;

(e) if step (d) indicates that the number of Servers per Farm does not exceed the benchmark value, then calculating the estimated Availability Level of the Server Farm;

(f) checking to see that the said calculated Availability Level meets or exceeds the Availability Level goal;

(g) if the Availability Level goal is not met or exceeded, then incrementing the number of Server Farms by "1";

(h) checking to see if the number of Server Farms is greater than 100 or not greater than 100;

(i) if the number of Server Farms is less than 100, then requesting through steps (b), (c), (d), (e), (f), (g), and (h) until step (h) indicates that the number of Server Farms is greater than 100;

(j) checking to see that the number of output recommendations is greater than "0";

(k) decrementing the Redundancy Factor in steps of 5% until no acceptable recommendations are available;

(l) incrementing the Redundancy Factor in steps of 1% to develop a set of recommendations which minimize the number of Server Farms while still supporting the number of users required and still meeting the Availability Level goal.

* * * * *